(12) United States Patent
Berkooz et al.

(10) Patent No.: US 12,351,185 B2
(45) Date of Patent: Jul. 8, 2025

(54) METHOD OF DETERMINING PARAMETERS OF INTERACTION BETWEEN A VEHICLE AND A ROAD

(71) Applicant: ZF Friedrichshafen AG, Friedrichshafen (DE)

(72) Inventors: Gahl Berkooz, Ann Arbor, MI (US); David Wilson, Milford, MI (US); Pulkit Monga, Westland, MI (US); Grigory Yezersky, Farmington Hills, MI (US); Lev Levin, Charlotte, NC (US); Olivier Barree, Elancourt (FR); Michael Klank, Osnabrueck (DE); Dennis Pape, Ostercappeln (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 241 days.

(21) Appl. No.: 17/967,197

(22) Filed: Oct. 17, 2022

(65) Prior Publication Data
US 2023/0123958 A1    Apr. 20, 2023

Related U.S. Application Data

(60) Provisional application No. 63/256,836, filed on Oct. 18, 2021.

(51) Int. Cl.
*B60W 40/06* (2012.01)
*B60W 40/13* (2012.01)

(52) U.S. Cl.
CPC ............ *B60W 40/06* (2013.01); *B60W 40/13* (2013.01); *B60W 2422/00* (2013.01); *B60W 2556/45* (2020.02)

(58) Field of Classification Search
CPC .. B60W 40/06; B60W 40/13; B60W 2422/00; B60W 2556/45; B60W 2050/0028; B60W 2422/10
See application file for complete search history.

(56) References Cited

U.S. PATENT DOCUMENTS

| 2022/0032946 A1* | 2/2022 | Zhao | G01S 7/417 |
| 2022/0266836 A1* | 8/2022 | Segawa | B60W 40/06 |

FOREIGN PATENT DOCUMENTS

| GB | 2589272 A | * | 5/2021 | B60T 8/172 |
| KR | 20140102533 A | * | 8/2014 | G01F 23/802 |
| WO | WO-2019205020 A1 | * | 10/2019 | G08G 1/0133 |

* cited by examiner

*Primary Examiner* — James M McPherson
*Assistant Examiner* — Kyle J Kingsland
(74) *Attorney, Agent, or Firm* — Kristin L. Murphy

(57) ABSTRACT

A method of developing a road conditioning monitoring model is disclosed. The method comprises utilizing vehicle sensors to collect data under controlled conditions over a road surface to develop a training data set. The training data set undergoes a data analysis to determine an absolute running mean associated with the first road surface under controlled conditions. Abnormalities in the road surface are detected by comparing the absolute running mean with the training data set. The detected abnormalities are classified to create road surface classification rules. A method of developing a road condition database is also disclosed, that comprises utilizing vehicle sensors during operation of a vehicle to collect data during the operation and feeding the data into the road conditioning monitoring model to classify the road conditions on which the vehicle is driven. A system for determining road condition impact on a vehicle is also disclosed.

9 Claims, 3 Drawing Sheets

METHOD OF DETERMINING PARAMETERS OF INTERACTION BETWEEN A VEHICLE AND A ROAD

TECHNICAL FIELD

The present disclosure relates to road condition identification, and more particularly, to a method of developing model for evaluating parameters of interaction between a vehicle and a road as well as a method for implementing the model.

BACKGROUND

The vehicles continually interact with the roads, and, as a result of this interaction, the vehicles continually experience variable mechanical loads, particularly in the case of adverse road conditions, often significant enough to cause emergence of various negative effects such as occupants' discomfort and fatigue, deterioration of vehicle performance, complete failure or shortened life of components and/or vehicle cargo, compromised safety, excessive costs. etc. Being able to measure loads during such an interaction is beneficial, but such measurement alone does not provide being able to intelligently predict (anticipate) this interaction (and hence its potential effects) prior to its occurrence. Being able to utilize such data to allow for such anticipation of road interaction would bring enormous value, as this information can deliver valuable insights about the road conditions, vehicles and their performance, interaction that may adversely impact vehicles' occupants, cargo, etc.

While the prior art teaches collection of observed road condition data and communication of such data, such as transmitting accident or estimated travel times information to a roadway reporting sign, such as, for example, a smart sign, what is needed is a method of collecting data via sensors positioned onboard a vehicle, and using this data to determine road conditions of the road surface itself, in real-time, as well as develop a road condition database that can serve as inputs into other systems to develop vehicle performance indicators/prompts, route suggestions, maintenance indicators, and the like.

SUMMARY

A method of developing a road condition monitoring model is disclosed. The method comprises, providing a vehicle that has at least one sensor that is configured to execute a controlled data collection operation during operation of the vehicle, performing a first vehicle operation over a road surface under controlled conditions and transmitting the collected data to a processing unit to create a raw reference data set. A data pre-processing operation is performed on the raw reference data set to create a training data set. Data analysis is then performed on the training data set to determine an absolute running mean. Abnormalities are detected in the road surface by comparing the absolute running mean with the training data set. The detected abnormalities are used to create rules for road classification within the training data set. A second vehicle operation is then performed without controlled conditions, the data being collected and imputed into the training set data according to the rules for classification. The model is then validated.

In another exemplary arrangement, a method of developing a road condition database is provided. The method comprises disposing at least one sensor on a vehicle that measures at least one variable that is indicative of road impact on a vehicle, as well as a GPS sensor so location of a detected variable can be captured. The sensors are capable of transmitting the data collected during operation of the vehicle to a processing unit in accordance with predetermined rules. The collected data is then converted to a unit of load and fed into a model for determining road conditions. The converted data is then processed, with the model detecting abnormalities in the road surface by comparing an absolute running mean of the model with the converted data and classifying abnormalities based on predetermined values within the model. The classified abnormalities are then stored within a database for further use.

DETAILED DESCRIPTION

Figure 1:
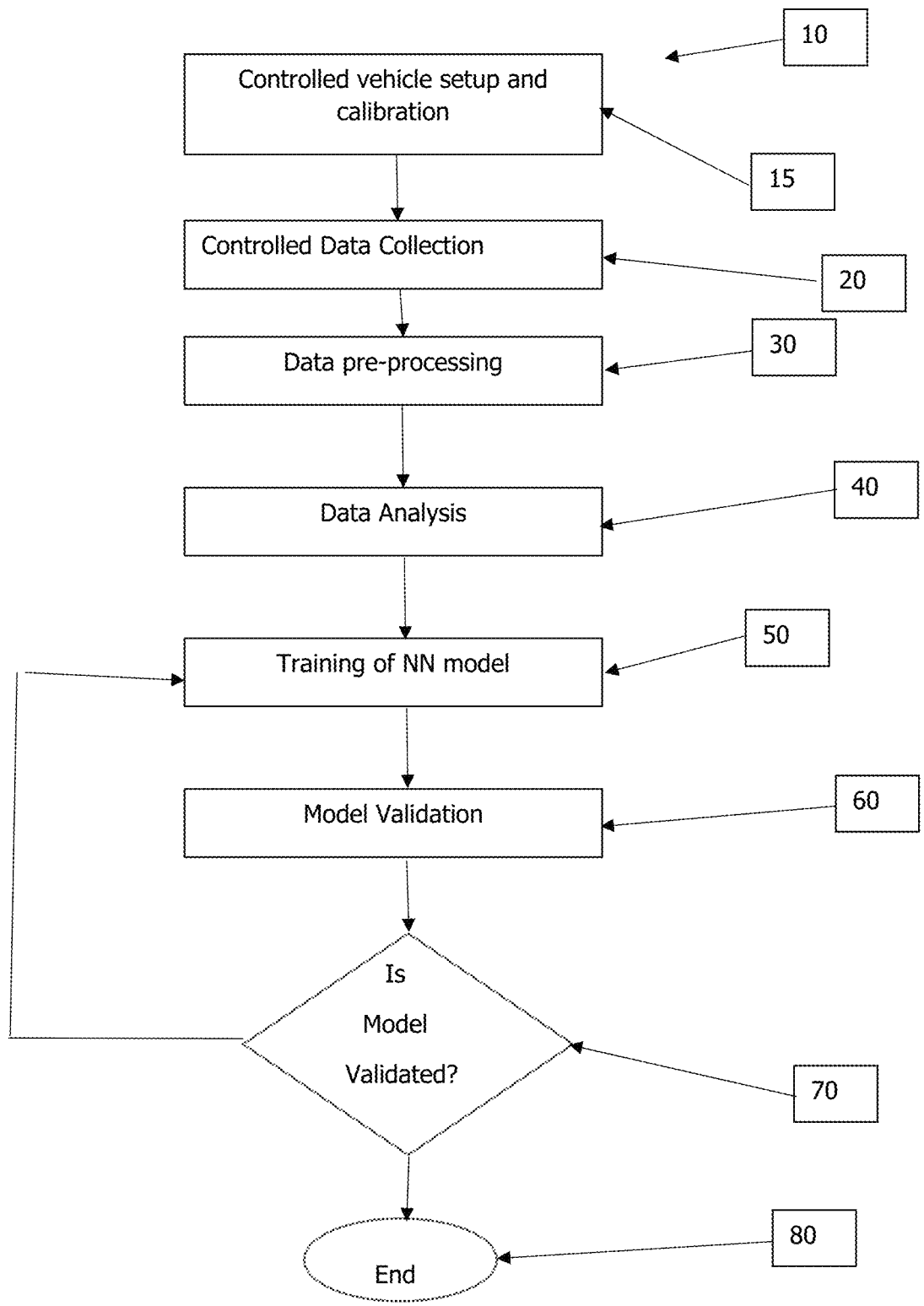
FIG. 1 is a flow chart that illustrates the creation of a model for determining road conditions.

A method of developing a model that may be used to provide beneficial information concerning road surface roughness is disclosed. Referring to the Figures, an exemplary method 10 of developing a model for collecting exemplary data and creating, for example, a road surface roughness database for predetermined areas is disclosed, along with an exemplary method of employing the model.

In one exemplary arrangement, before the start of the method 10 of creation of the model, to ensure collection of accurate and true data for development of the model, a controlled vehicle set up and equipment calibration 15 may be employed. With this step, the equipment operation can be validated to ensure accurate data collection. The method 10 then proceeds to a controlled data collection operation 20.

In one exemplary arrangement, in the controlled data collection operation 20, various data points are collected under controlled conditions to create a reference set (i.e., a ground truth), as well as creating a dataset from vehicle operation information from various sensors within the vehicle.

More specifically, in one exemplary arrangement, the controlled data collection 20 is performed on different, known surfaces, at select and known speeds. For example, the data is collected on different road surfaces such as, for example, gravel and paved roads, but at varying speeds, such as low, medium, and high speeds. In one exemplary arrangement, the data collection may be performed on a test track, that has known road conditions. As the road surfaces are known, as are the speeds, the accuracy of the collected information can be verified to create a robust working reference data set. For creating the reference set, the data collection can be done both visually and manually, using known measurement techniques. In addition, a dataset is also created in the controlled data collection step 20, for vehicle operational information from data collected from various sensors mounted in a vehicle during a controlled drive on the known road surface. Sensors that may be employed include, for example, global positioning sensors, ball joint sensors, accelerometers, CAN data and wheel movement sensors. However, it is understood that other operational sensors may also be utilized.

The collected data is transmitted to a processing unit, i.e., either an onboard vehicle computer or a cloud-based computing system. For example, in one exemplary arrangement, data may be collected from the sensor in a tabulated form, which may be synched by time stamps. Thus, the time stamp and sensor output data may be used to identify the position of the road being traveled. Once the data is collected, the method may advance to step 30.

In step 30, the collected data undergoes a data pre-processing operation. More specifically, the collected data is reviewed and sanitized to "clean" the data such that the data collected corresponds to accurate readings from the sensors. For example, in one exemplary arrangement, recorded "no data intervals," such as data points where a sensor failed (i.e., zero data collected) may be removed to create a robust database and model. In other exemplary arrangements, recorded voltage spikes may be investigated and compared with the ground truth data, to verify that any collected voltage spikes are due to the road condition interaction, as opposed to harsh driving actions, such as abrupt braking, etc. Data induced by noise is also filtered out. Once the collected data is "cleaned", the data is structured to create a training data set for the model. For example, the initial data set is utilized to assist a program in applying processing technologies, like neural networks to learn and produce sophisticated results. Continuing from the example above, the time synched data from all sources of the vehicle may be stored in a tabular form in a pre-production cloud computing environment that processing equipment may access. More specifically, the time stamps act as a primary key and other data sources like CAN data, GPS position, sensor data values are correlated to the time stamp. A tabular data base is then created on the edge (i.e., the vehicle computing system), and data may be sent through a telematics (IOT) device and stored in the cloud. The method 10 then proceeds to step 40.

Once the training data set is created, in step 40, data analysis is performed to determine a frequency range of the road surface under "normal/perfect conditions." In other words, an absolute running mean of the vehicle operation is determined and saved. In one exemplary arrangement, the running mean determined and saved as structured data is streamed over the air to a server. A telemetry message queue may be utilized, whereby a packet/chunk of data is considered a message. While the packet of data is in the queue, known statistical methods are applied to calculate an output which is mean. This "mean" output is added to the tabular set before it is stored in the database. For example, a data packet of 10 seconds is sent together and processed together before being stored in the database server.

Using the absolute running mean, abnormalities in the roadway are detected within the data set (for example, potholes) by identifying a difference between recorded data points and the absolute running mean to determine the length, depth and shape of the abnormality. Data concerning the abnormalities are stored and classified to be used in later steps in the method 10. The method 10 then proceeds to step 50.

In step 50, training of a neural net ("NN") model is performed. In one exemplary arrangement, the training is unsupervised. During step 50, more data is fed into the training data set, which is classified by predetermined rules derived from the classification in step 40. In one exemplary arrangement, PASER standard road classification methods are used to define the predetermined rules. However, classification can be modified based on the location being analyzed, and/or customer requirements. In one exemplary arrangement, artificial intelligence or a neural net may be implemented to develop the model. The method 10 then proceeds to step 60.

In step 60 a model validation operation is performed to confirm the viability as a model. More specifically, the results from the model with respect to a predetermined location from step 50 are then compared with previously collected "ground truth" data to verify viability of the model. For example, in one exemplary arrangement, the model determines its own Key Performance Indicators ("KPIs") after the processing the data, i.e., ground truth road classification of a known traveled surface on a test track was PASER level 1 during the controlled data collection. This established data point serves as training data. In step 70, a determination is made to verify if the results obtained from the model are within predetermined acceptable limits, in which case, the model is considered to be "trained" and ready for implementation and the method 10 proceeds to end 80.

Using the example above, if the model classifies the known traveled surface on the test track close to the PASER level 1 (within an acceptable deviation) after the vehicle travels over the same surface during the validation operation, then the model is considered "trained". If the results obtained from the model are outside the predetermined deviation, the model has not been validated and process returns to step 50 to retrain the NN model.

Figure 2:
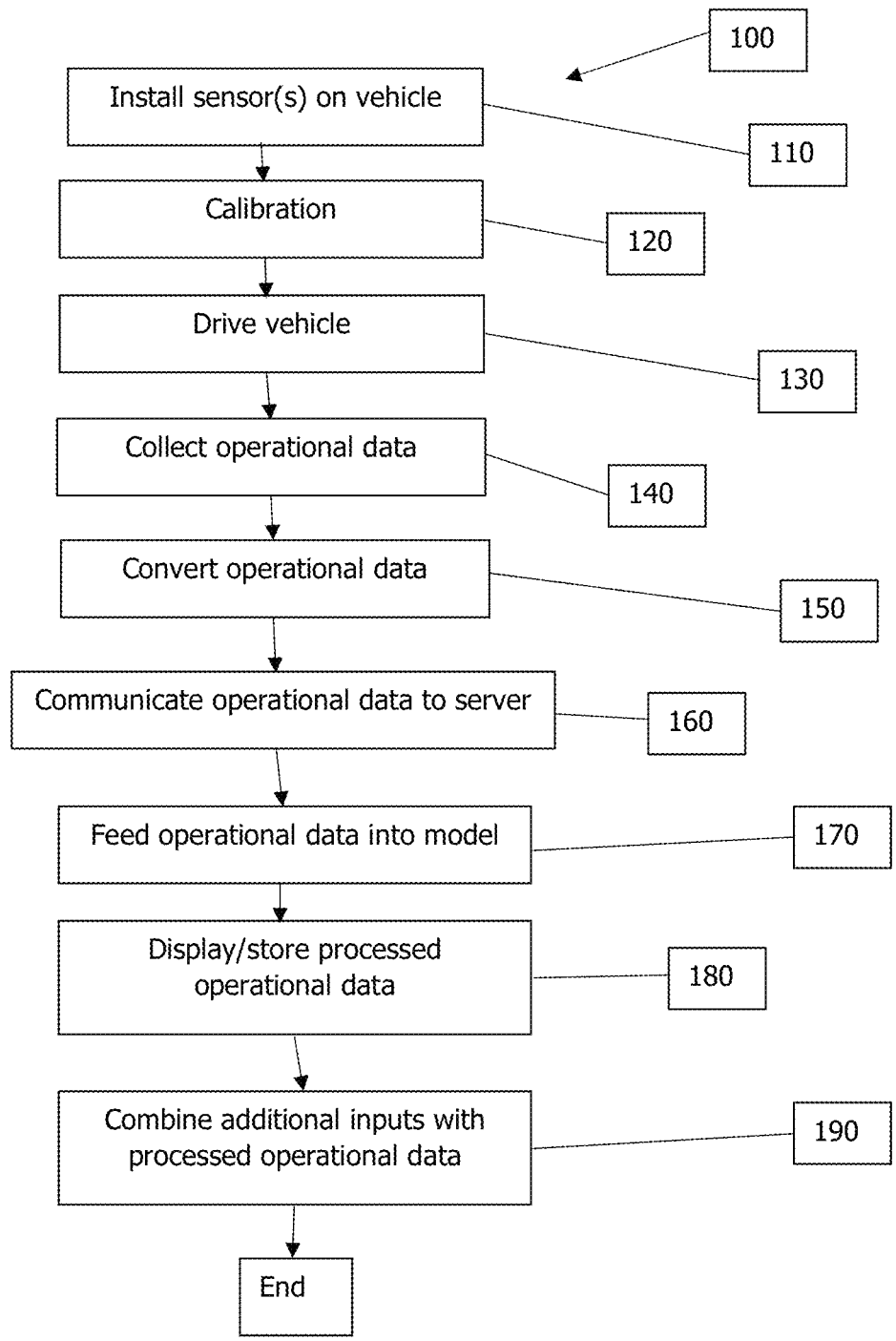
FIG. 2 is a flow chart illustrating use of the model in creation of a road condition database.

Once the model 10 has been developed, it may be utilized to develop a road condition database that can be utilized to trigger a number of additional functions for drivers, vehicle operation and maintenance, cargo management, and warranty analysis, for example. An exemplary method 100 of developing the road condition database, will now be described in connection with FIG. 2.

Figure 3:
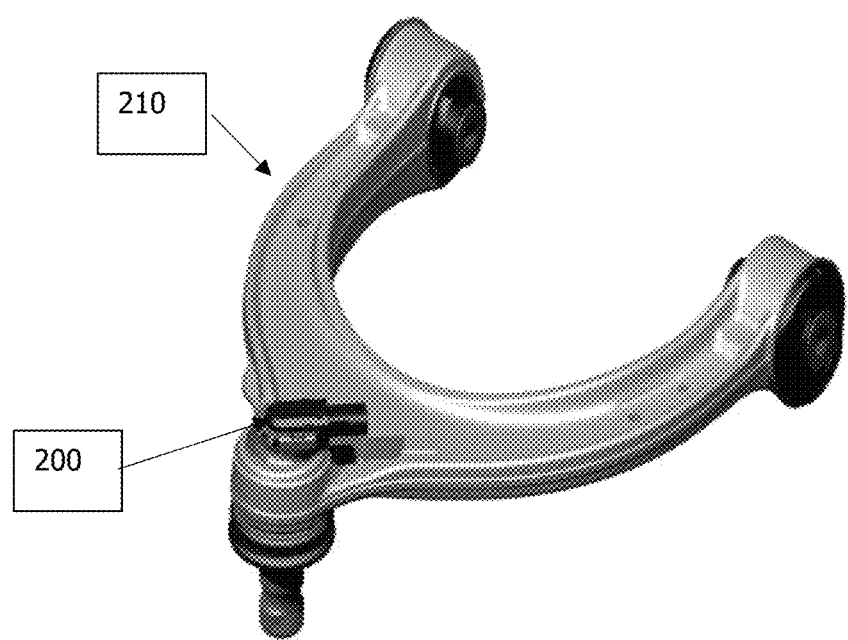
FIG. 3 is a perspective view of an exemplary ball joint sensor.

The method of developing the database 100 begins by disposing at least one sensor that is capable of measuring different variables that is indicative of road impact on a vehicle, and enables continual or episodal transmission of such data, as well as a GPS, transceiver and antenna. In one exemplary arrangement, integration of a sensor 200 into a ball joint 210, as shown in FIG. 3, will allow for continual accurate measurement of the load that a road induces into a vehicle body. In addition, a ball joint sensor 200 will also provide operational data about wheel displacement, wheel angle of travel, etc.

However, it is understood that there are many additional sensors (not shown) that may either directly or indirectly measure the load a road induces into a moving vehicle. As additional examples, such sensors can be integrated into the wheel or other parts and components of the vehicle. Accelerometers used in a vehicle safety system (as part of the airbag deployment process) can serve as such sensors. Finally, it is also contemplated that even a cell phone positioned inside the vehicle (which typically have both accelerometers and gyros) has the capability to collect data of this kind. It is also contemplated that a system of sensors of various kind/nature that are connected together may be employed in step 110 to acquire operational data.

Referring back to FIG. 2, once the sensor 200 is installed, in step 110, the vehicle and sensor equipment is calibrated. The method 100 then proceeds to step 120.

In step 120, the vehicle is driven in the normal course. The method 100 then proceeds to step 130.

In step 130, after the vehicle is in motion, the sensor(s) disposed on the vehicle and the GPS collect data, either continuously or at predetermined intervals from the driving operation. Sampling rate of the data is dependent upon the sensor being used. Further, higher sampling rates provides more data, but also provides more accurate results. For example, the ball joint sensor can be programed to generate a voltage value between 200 and 5000 times per second. Other vehicle data sensors, such as GPS, can also vary widely on sampling rate. The data set can be engineered using common time stamps from all data sources on the edge device.

Output from the sensors is typically presented in units of voltage (or other electrical circuit parameters). To be utilized, the output needs to be converted into units of load (force) and other vehicle-related parameters. Thus, in step 140, the collected data is converted into units of load. In one exemplary arrangement, the collected data may be stored onboard of the vehicle, for example, in a memory of a processing unit (not shown) mounted in the vehicle and the conversion step 140 may be undertaken in the vehicle.

More specifically, in one exemplary arrangement, the conversion may happen "at the edge"—i.e., on the sensor level. In other words, the raw data is processed on board. In another exemplary arrangement, the conversion may be undertaken by the vehicle processing unit and processed on the cloud.

In other exemplary arrangements, rather than storing the collected data onboard of the vehicle, in step 150, the data may be communicated to a server. In this exemplary arrangement, the data may be communicated to the server prior to conversion into units of load. Alternatively, the data may be communicated to the server after the data was converted. Further, when the information gathering capability of the sensors are combined with a vehicle's communication system, the collected operational data may be transmitted continuously within a network or transmitted at discrete predefined intervals and stored for further use.

In one exemplary arrangement, the output of the data collected may be converted on the server. In yet another example, the data conversion may be distributed between different levels of the overall system hierarchy, i.e., between the sensors, vehicles, and server.

In step 160, once the data is transmitted to the server and converted to load, the data is fed into the model developed in method 10 and processed. The method 100 then proceeds to step 170.

In step 170, the results of the processed data from the model, are displayed and/or stored and may be used as an input for additional applications. More specifically, in one exemplary arrangement, the processed data may be used for classifying roads and their respective conditions. For example, in one exemplary arrangement, in step 180, additional inputs such as type of road, (i.e., pavement vs. dirt road vs. highway concrete road) may be coupled with the measured data. In addition, utilization of a vehicle's location (through GPS) allows for association of the collected operational data about the road conditions with specific locations to develop a road condition database.

With this information, the measured road surfaces can be assigned a "frequency" number. In one exemplary arrangement, the frequency number may be based on an average frequency of the load being induced by the road onto the passing vehicle. For example, a cobblestone road and a concrete highway will have different frequency numbers indicative of the road condition and will provide information on the potential effect that road condition will have on vehicle performance, allowing for adjustments to be made. As another example, different parts of the same roadway may have different frequency numbers. More specifically, one section of a concrete highway may have "perfect conditions" while other sections may be plagued with a lot of potholes and thus have different frequency numbers than the section with a "perfect" road surface.

The operational processed data permits a determination of a condition of the road under the vehicle wheels and may provide a high-level overview of the status of roads and bridges from the aggregated vehicle data. Such information allows users to filter road class levels and allows detection of anomalies, such as potholes. It is contemplated in one exemplary arrangement, that a user may generate a summary report from the database, of a desired area or route that provides road surface changes and corresponding GPS locations, summary of potholes, including number and estimated sizes, as well as other identifiable road anomalies or even unidentified objects on the road. In some instances, the vehicle's onboard camera systems may be operated to take photos of anomalies under predetermined conditions and transmit those photos to the database to be accessed by a user. With knowledge of the road conditions, the operational parameters of the vehicle may be selectively manipulated to account for such road conditions, including improving the vehicle ride for the occupants, adjusting parameters to account for vehicle load, etc. In other exemplary arrangements, the information may be utilized for predictive maintenance, such as road predictive maintenances, or vehicle predictive maintenances.

A system for developing and using a road condition database that can be utilized to determine road impact on a vehicle is also contemplated. More specifically, the system comprises at least one sensor disposed on a vehicle, whereby the sensor is capable of measuring at least one operational data variable, as well as a GPS sensor disposed either on the vehicle or in the vehicle (such as a phone or other personal electronic device capable of communicating GPS information). The system further comprises at least one vehicle identification data element.

The system further includes a processing unit, wherein the sensor data and GPS sensor information is capable of being transmitted to the processing unit. In one exemplary arrangement, the processing unit is disposed at the edge. Alternatively, the processing unit is an external server. The processing unit is further configured to convert the sensor data and GPS sensor information to a vehicle operational value. The processing unit further includes a predetermined model into which the vehicle operational value if inputted.

The model further includes an absolute running mean. The processing unit compares the absolute running mean with the converted vehicle operational value and classifies the abnormalities based on predetermined values in the model.

The system also includes a database into which the processed converted data may be stored. The database may be stored on the vehicle or on an external server. Information from the database may be used as inputs for other operational systems in the vehicle or external to the vehicle. For example, the database may be used to generate updates to a vehicle map system to designate rough road types, such as potholes or cobblestone roadway, to allow a driver to choose alternative routes to minimize wear on a vehicle.

It is noted that the exemplary arrangements can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, exemplary arrangements can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing that contain or carry instruction(s) and/or data.

What have been described above are examples of the present disclosure. It is, of course, not possible to describe every conceivable combination of components or methodologies for purposes of describing the present invention, but one of ordinary skill in the art will recognize that many further combinations and permutations of the present invention are possible. While certain novel features of this disclosure shown and described below are pointed out in the annexed claims, the disclosure is not intended to be limited to the details specified, since a person of ordinary skill in the relevant art will understand that various omissions, modifications, substitutions and changes in the forms and details of the disclosure illustrated and, in its operation, may be made without departing in any way from the spirit of the present disclosure. Accordingly, the present disclosure is intended to embrace all such alterations, modifications, and variations that fall within the scope of the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements. No feature of the disclosure is critical or essential unless it is expressly stated as being "critical" or "essential."

What is claimed is:

1. A method of training a road condition monitoring model, the method comprising:
    detecting, using one or more sensors on a vehicle, road surface data, under a controlled data collection operation during operation of the vehicle,
    wherein the detecting step is accomplished by performing a vehicle operation over a first road surface under controlled conditions and executing the controlled data collection from the one or more sensors under the controlled conditions;
    transmitting the collected data from the one or more sensors from the vehicle operation under the controlled conditions to a processing unit to operatively connected to the vehicle to create a raw reference data set from the data collected under the controlled conditions;
    generating, by the processing unit a data pre-processing operation on the raw reference data set to create a training data set;
    storing the training data set within the processing unit and performing a data analysis of the training data set by the processing unit to determine frequency ranges of a section of the first road surface under a first predetermined condition to determine an absolute running mean;
    wherein the processing unit is configured to generate an indication of abnormalities in the first road surface in remaining sections of the road surface by comparing the absolute running mean with the training data set; and
    classifying abnormalities to create classifications rules within the training data set to define a preliminary model.

2. The method of claim 1, further comprising employing equipment calibration of the vehicle prior to executing the controlled data collection operation.

3. The method of claim 1, wherein the controlled data collection is performed on known surfaces at predetermined speeds.

4. The method of claim 1, wherein the data pre-processing operation further comprising reviewing the raw reference data set to verify accurate data collection and removal of collected data from the raw reference data set that are determined to be erroneous.

5. The method of claim 4, wherein collected data that is determined to be generated from harsh driving operations is removed from the raw reference data set.

6. The method of claim 4, where instances of no data intervals are removed from the raw reference data set.

7. The method of claim 1, wherein the one or more sensors includes a ball joint sensor.

8. The method of claim 1, further comprising performing a second vehicle operation over the first road surface without controlled conditions, collecting data during the second vehicle operation and imputing the collected data from the second vehicle operation into the training data set according to the rules for classifications.

9. The method of claim 8, performing a model validation operation to compare data collected from the second vehicle operation with the data collected with the first vehicle operation to verify that the collected data from the second vehicle operation does not deviate from the data collected from the first vehicle operation by a predetermined value.

\* \* \* \* \*